United States Patent [19]

Vanderhorst et al.

[11] 4,274,649
[45] Jun. 23, 1981

[54] BICYCLE TRAILER AND HITCH

[76] Inventors: Ed W. Vanderhorst, 6718 Whitaker Ave.; Henry L. Vanderhorst, 6536 Langdon Ave., both of Van Nuys, Calif. 91406

[21] Appl. No.: 12,529

[22] Filed: Feb. 15, 1979

[51] Int. Cl.³ .................... B60D 1/06; B62K 27/12
[52] U.S. Cl. .................. 280/204; 280/47.26; 280/511
[58] Field of Search .............. 280/204, 47.26, 63, 280/415 R, 415 A, 477, 1.5, 511, 515, 474

[56] References Cited

U.S. PATENT DOCUMENTS

| 2,725,242 | 11/1955 | Peplin | 280/415 R |
|---|---|---|---|
| 3,012,796 | 12/1961 | Mieding | 280/204 |
| 3,081,663 | 3/1963 | Davis | 280/515 |
| 3,271,048 | 9/1966 | Beesley et al. | 280/63 |
| 3,891,237 | 6/1975 | Allen | 280/477 |

FOREIGN PATENT DOCUMENTS

| 867551 | 11/1941 | France | 280/204 |
|---|---|---|---|
| 15287 | of 1901 | United Kingdom | 280/204 |
| 422768 | 1/1935 | United Kingdom | 280/204 |

Primary Examiner—Randolph A. Reese
Assistant Examiner—Donn McGiehan
Attorney, Agent, or Firm—Nilsson, Robbins, Dalgarn, Berliner, Carson & Wurst

[57] ABSTRACT

A quick release trailer and hitch apparatus has a container mounted on a pair of wheels with a pair of pull bars attached for being adjacent to the outer front corner regions of the container. The pull bars being gradually and continuously together with their remote ends attached to a connecting member. The connecting member has a center gripping portion and a rigid attachment portion with an orifice therethrough. A swivel member, permanently coupled on a ball member and freely rotatable thereabout, has a hitch portion with a first passageway for receiving the rigid attachment portion and a second passageway intersecting the first passageway. A spring loaded pin is provided to extend through the second passageway and the orifice in the rigid attachment portion to hold the swivel member and the connecting member immovable relative to each other. The ball member is attached to the bicycle in any appropriate way, such as with a bracket.

3 Claims, 4 Drawing Figures

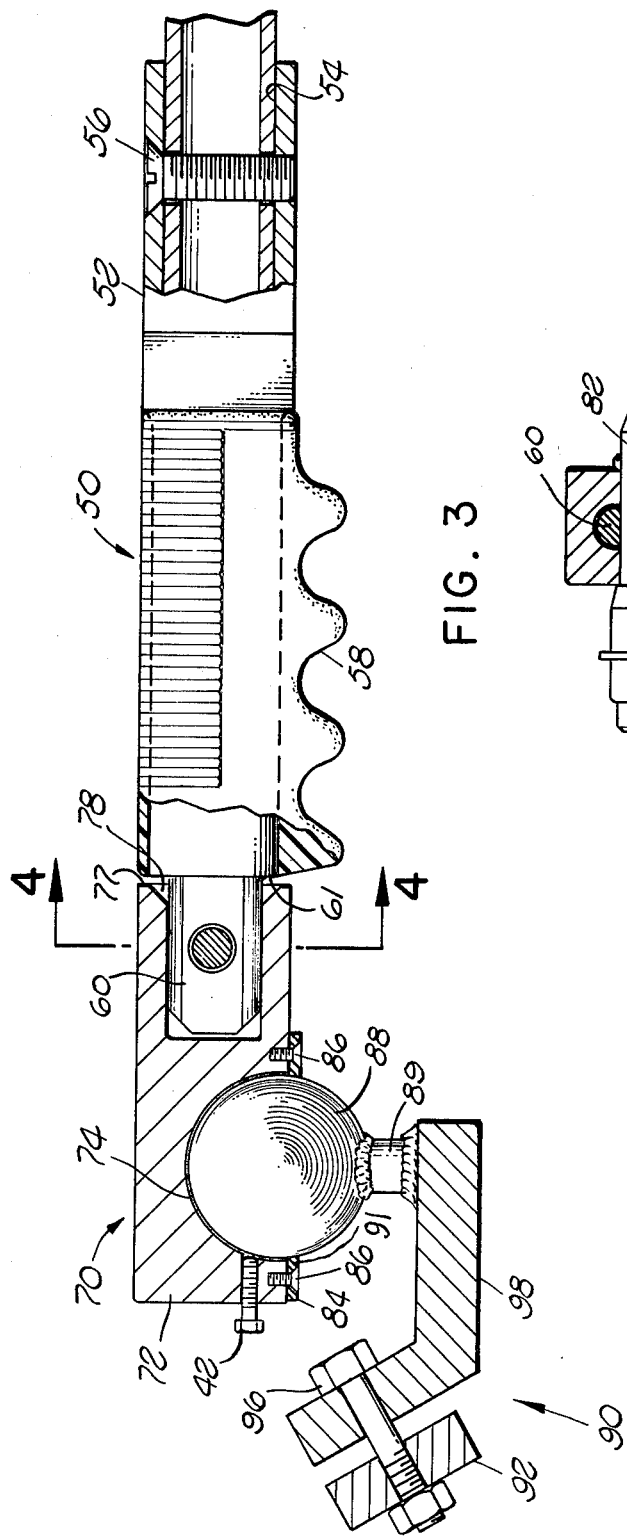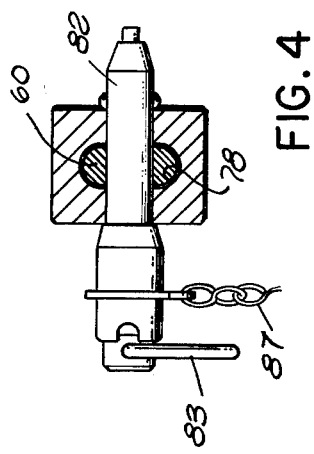

BICYCLE TRAILER AND HITCH

BACKGROUND OF THE INVENTION

The present invention relates to a hitch and trailer apparatus and, in particular, to a hitch and trailer apparatus adapted to be pulled by a bicycle.

A number of trailer and hitch apparatus for use in conjunction with bicycles have been devised. One goal of such apparatus has been that back and forth or up and down motion of the bicycle be isolated from similar motion of the trailer so that complete and full control over the operation of the bicycle will not be impeded by the trailer.

Various universal joint mechanisms have been devised which attempt to achieve this goal. For example, in U.S. Pat. Nos. 624,678, issued May 9, 1889, to J. Planes; 3,567,249, issued Mar. 2, 1971, to R. S. Robinson and 3,877,723, issued Apr. 15, 1975, to Fahey, et al, various universal-type joint mechanisms are disclosed. However, each of these universal joints provide two or more orthogonal fixed axes about which rotation is permitted. Such an arrangement has been found to cause throbbing, that is, relative forward or backward motion between the bicycle and the trailer. Such throbbing motion significantly effects the ability of an operator to control the bicycle and, under certain circumstances, could cause the trailer to jack-knife or otherwise tend to tip over. By contrast, the present invention provides a fixed ball and socket arrangement which does not have any fixed axes of rotation but rather allows smooth and continuous rotation about substantially the entire ball. The ball and socket joint of the present invention substantially eliminates all throbbing and thus permits the bicycle operator to maintain control over the bicycle while towing the trailer.

Various ball and socket type joints have been utilized in trailer and hitch assemblies. For example, in U.S. Pat. No. Reissue 26,806, issued Mar. 30, 1970, to R. S. Robinson, a ball and socket arrangement is disclosed whereby the ball is attached to the axle of a bicycle wheel. By contrast, the present invention provides a ball attached to the frame above the wheel thus allowing substantially more freedom of movement of the bicycle in turning situations.

In U.S. Pat. No. 4,077,645, issued Mar. 7, 1978, to Dortch, et al, a ball and socket type interconnecting hitch is disclosed. However, in that arrangement, the interconnecting member has a hook-like neck so that the interconnection to the ball is made vertically from a top of the ball. Such a neck protrusion could cause injury to an operator in case of an accident.

In U.S. Pat. No. 4,077,646, issued Mar. 7, 1978, to Watkins, another ball and socket type hitch arrangement is shown. However, reference to FIG. 5 shows that in order to provide maximum side-to-side motion of the bicycle, the ball must be rotated so that the connecting stem is substantially in a horizontal orientation rather than a vertical orientation. Thus, the ball and socket apparatus disclosed is substantially limited in its freedom of movement. In addition, a substantial problem of keeping the socket on the ball would arise utilizing the arrangement shown in FIG. 5.

Finally, in U.S. Pat. No. 3,492,024, issued Jan. 27, 1970, to J. H. Cooper, a trailer hitch for motorcycles is shown incorporating a ball and socket type arrangement. However, the arrangement illustrated does not provide for any substantially side-to-side motion. Indeed, in each of the above-identified ball and socket type interconnecting apparatus, a primary purpose of the apparatus is to provide a means for coupling and decoupling the trailer from the bicycle. Thus, each apparatus incorporates an attachment mechanism in the bolt and socket joint which inhibits free motion of the socket about the ball. By contrast, in the present invention, the socket is permanently attached to the ball. Disconnection of the trailer from the bicycle occurs by providing a hitch portion to the swivel or socket member. The hitch portion has a first passageway into which a rigid attachment portion fixed to the trailer may be inserted. A transverse hole or passageway intersects the first passageway. The orifice in the end of the rigid swivel attachment end is aligned with the second passageway and thereafter held in place by a spring loaded release pin.

The trailer may be released from the bicycle by simply removing the release pin and extracating the rigid attachment end from the first passageway in the swivel member. Because the connection and disconnection is not made by removing the ball from the socket, a retention plate member may be utilized to allow far greater freedom of movement of the ball within the socket and thus more completely isolates movement of the bicycle from the trailer and vice versa. Because of the greater freedom in motion, utilizing the present invention, the bicycle may be laid down on the ground without causing the trailer to tip or otherwise be upset.

Thus, the present invention provides a novel means by which only the bicycle's forward motion is imparted to the trailer and all other relative motion between the trailer and the bicycle is isolated so that motion of the bicycle does not affect the trailer and motion of the trailer does not affect the bicycle. In addition, the present invention provides a means by which the trailer may be quickly and easily disconnected from the bicycle and hand pulled.

A permanent ball and socket type interconnection is shown in U.S. Pat. No. 4,037,853, issued July 26, 1977, to Sparks, and in U.S. Pat. No. 2,370,988, issued Mar. 6, 1945, to Neal. However, in these patents the ball and socket type interconnecting is such that motion between the trailer and bicycle is substantially coupled or otherwise limited. In addition, neither of these two patents provide for any quick disconnection mechanism. For example, in Sparks, the disconnection must be made by unscrewing a bolt by which the ball member is attached to the bicycle. By contrast, the present invention is a very simple mechanism which substantially isolates motion between the trailer and bicycle, except in the forward or pulling direction. Because of the simplicity of the present invention, it is substantially less expensive and easier to build than prior devices.

SUMMARY OF THE INVENTION

The present invention is a trailer and hitch assembly for attachment to a vehicle which comprises a ball member coupled or otherwise attached to the vehicle and a swivel member having a socket means for permanently mounting the swivel member onto the ball member so that the swivel member is freely movable about the ball member. The swivel member also has a hitch portion which preferably has a closed ended first passageway and a second passageway which intersects the first passageway near its closed end. A connecting member is then provided for being releasably interconnected to the hitch portion of the swivel member whereby substantially all relative movement between the swivel member and the connecting member is prevented when the connecting member and the swivel member are interconnected. A trailer assembly is permanently coupled to the connecting member and is immovable relative thereto so that the relative motion between the bicycle and the trailer is entirely about the ball member.

The ball member may be attached to the bicycle by an appropriate bracket means.

In the preferred embodiment, the connecting member has a gripping means whereby the trailer assembly may be hand pulled when the trailer is disconnected from the hitch portion of the swivel member.

The trailer is interconnected to the swivel member by inserting a rigid first end of the connecting member having an orifice therethrough, into the first passageway until the orifice and the second passageway are aligned. A release pin is then inserted through the second passageway and the orifice to interconnect the trailer to the swivel member. Automatic alignment of the orifice and the second passageway upon insertion of the first end of the connecting member into the first passageway may be achieved by providing a non-circular cross-section for both the first passageway and the rigid first end. The depth of the first passageway may then be selected so that the rigid first end bottoms out at a point where the orifice and the second passageway are in alignment.

The trailer assembly preferably comprises wheel means which may, for example, be a pair of wheels rotatably attached to opposite ends of an axle; a container means, which may be mounted to the axle; and a pull means which is rigidly interconnected between the container means and the connecting member. The pull means may comprise a pair of pull bars attached to the container means on opposite sides thereof whereby the spacing of the pull bars at the front of the container means is about the same as the width of the front of the container means and the spacing between the pull bars continuously and gradually decreases in the direction of the connecting member to thereby provide a trailer deflection safety mechanism to prevent the trailer from hooking on an object while the trailer is in motion.

Finally, a locking mechanism may be provided whereby the swivel means may be made immovable relative to the ball. Such a mechanism may, for example, be a lock screw which is positioned to extend into the socket portion of the swivel member so that, when tightened, the end of the screw presses the ball against the side of the socket to thereby make the swivel member immovable relative to the ball. Of course, various other mechanisms may be utilized to make the swivel member immovable relative to the ball.

BRIEF DESCRIPTION OF THE DRAWINGS

A complete understanding of the present invention may be gained from a consideration of the following description of the preferred embodiments taken in conjunction with the accompanying drawings in which:

FIG. 3 is a cross-sectional view through section 3—3 of FIG. 2; and

FIG. 4 is a cross-sectional view through the line 4—4 of FIG. 3.

DETAILED DESCRIPTION

Figure 1:
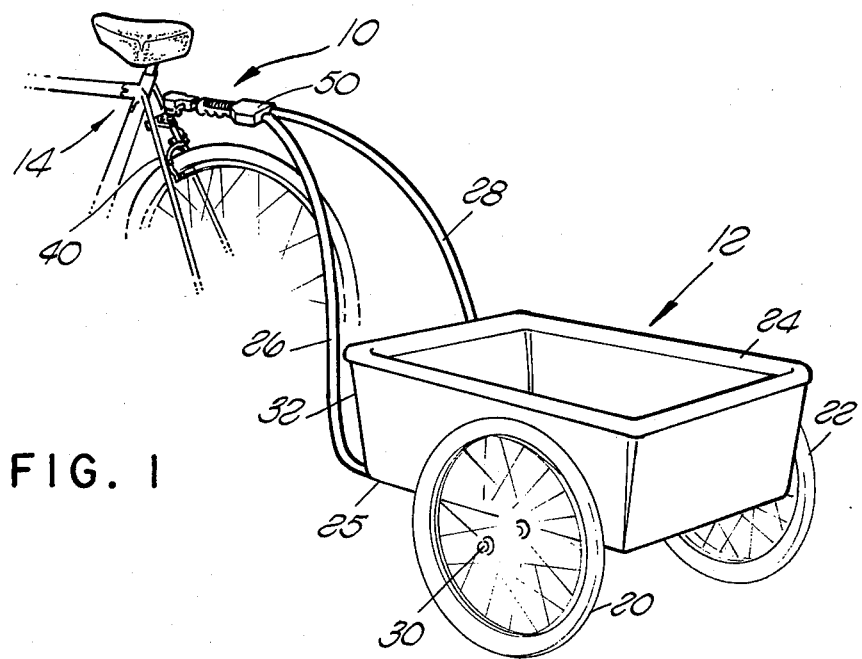
FIG. 1 is a perspective plan view of the present invention showing a trailer and hitch apparatus in accordance with the present invention.

Referring first to FIG. 1, a trailer and hitch assembly in accordance with the present invention is illustrated having a trailer assembly 12 interconnected to a vehicle, such as a bicycle 14, utilizing a hitch assembly 10. In one embodiment, the trailer assembly 12 may have a pair of wheels 20 and 22 such as conventional bicycle wheels rotatably attached to an axle means 30 which may be a single axle or a pair of individual axles separately mounted. A container 24, is then interconnected to the axle means 30 to provide an appropriate moveable container means. The container 24 may, for example, be made of molded plastic or other suitable material of any desired size.

The trailer assembly 12 also has pull means which in one embodiment comprises a pair of pull bars 26 and 28. In the preferred embodiment, the pull bar 26 is attached to the container 24 along one of its lower edges 25 and the pull bar 28 is attached to the opposite lower edge (not shown) of the container 24. The two pull bars 26 and 28 are then bent upwardly away from the container 24 and inwardly in a generally S-shape. Both pull bars 26 and 28 are then coupled in a rigid manner to a connecting member 50 which is part of the hitch assembly 10.

Alternatively, and to provide additional strength, the pull bars 26 and 28 may be attached directly to the axle means 30. Regardless of the particular point or method of attachment of the pull bars 26 and 28 to allow the container wheel assembly to be pulled, it will be understood that in accordance with the invention, the spacing between the pull bars 26 and 28 at the point where they contact the front 32 of the container 24 is about the same as the width of the front 32 of the container 24. Furthermore, the spacing between the pull bars 26 and 28 continuously and gradually decreases in the direction of the connecting member 50.

An effective deflection mechanism is provided by the positioning of the pull bars 26 and 28 so that a substantial portion of the front of the container 24 will be between the pair of pull bars 26 and 28 with the pull bars being bent in a continuous and grandual manner toward the hitch. This deflection mechanism will prevent the trailer assembly 12 from hooking around an object, such as a pole or other object such as when the trailer assembly 12 follows the bicycle 14 about a turn in close proximity to the pole or object. To provide additional protection from hooking an oval or rounded front may be provided for the container configuration itself. Of course, various deflection mechanisms may also be provided without departing from the spirit of the invention.

Figure 2:
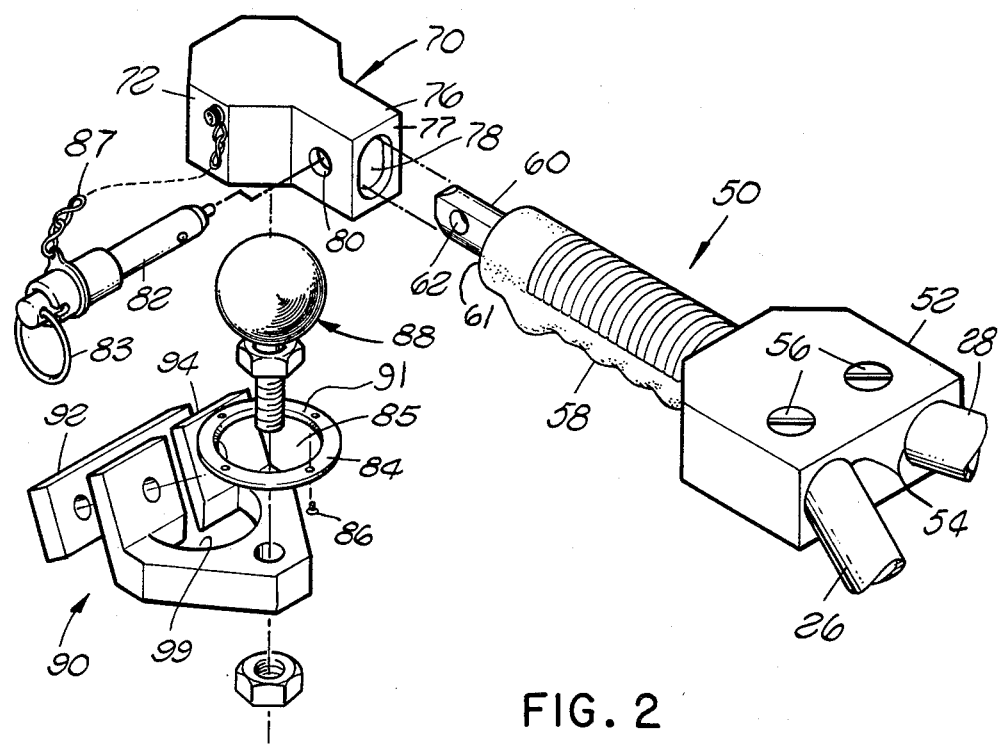
FIG. 2 is an exploded perspective of the hitch assembly of the present invention.

Referring now to FIG. 2, an exploded perspective view of the hitch assembly is illustrated having a connecting member 50, a swivel member 70, a ball member 88, and a bracket means 90.

More specifically, the connecting member 50 comprises a pull bar attachment portion 52 at one of its ends and a rigid swivel attachment end 60 at its opposite end. A gripping means 58, such as a bicycle handle grip, is positioned between the rigid swivel attachment end 60 and the pull bar attachment end 52. A passageway means 54 is provided to extend into the pull bar attachment portion 52 for receiving the pull bars 26 and 28 which may be attached to the connecting member 50 by one or more bolts 56. Of course, it will be appreciated that any appropriate attachment means may be utilized to attach the pull bars 26 and 28 to the connecting member 50 provided the interconnection is rigid so that there is substantially no movement between the connecting member 50 and the pull bars 26 and 28.

The central gripping means 58 may be provided so that the trailer assembly may be hand pulled when it is disconnected from the bicycle.

The rigid swivel attachment end 60 extends in front of the gripping means 58 and is made of a rigid material, such as aluminum or steel. An orifice 62 is provided through the end of the rigid swivel attachment end 60 to provide a means of connecting the trailer assembly 12 to the swivel member 70 and hence to the bicycle in a manner to be hereafter described.

The swivel member 70 generally comprises a hitch portion 76 and a socket portion 72. The hitch portion 76 has an inwardly extending first passageway 78 for receiving the rigid swivel attachment end 60 of the connecting member 50, and a second passageway 80 which intersects the first passageway 78 in the interior of the hitch portion 76. In the preferred embodiment, the cross-section of the rigid swivel attachment end 60 and the cross-section of the first passageway 78 will have a substantially non-circular shape so that the orifice 62 will align radially with the second passageway 80 when the rigid swivel attachment end 60 is inserted into the first passageway 78. For example, in the embodiment illustrated, the cross-section of the rigid swivel attachment end 60 and the cross-section of the first passageway 78 are both generally oval, that is, without sharp edges thereabout.

Longitudinal alignment may be provided by selecting the depth of the passageway 78 so that the rigid end 60 "bottoms out" at a point where the orifice 62 and the second passageway 80 are in alignment. Alternatively, the alignment may occur when a shoulder 61 of the connecting member 50 comes in contact with a swivel member end surface 77. As can be seen, additional rigidity at the point of connection will occur if the surface 77 is in contact with the shoulder 61.

In order to hold the connecting member 50 and the swivel member 70 together, a release pin 82 is provided to be inserted through the second passageway 80 and extending through the orifice 62. The cross-section of the rigid swivel attachment end 60 is preferably the same shape but just slightly smaller than the cross-section of the first passageway 78 so that when the release pin is in place, the swivel member 70 and the connecting member 50 will be substantially immovable relating to one another.

In providing a rigid immovable interconnection between the swivel member 70 and the connecting member 50 and between the connecting member 50 and the respective pull bars 26 and 28, "throbbing", i.e., relative motion between the bicycle and the trailer, is eliminated. Such throbbing has been a significant problem in prior devices in that it adversely affects the control which the bicycle rider has over the bicycle when a trailer apparatus is being pulled.

Referring to FIG. 3 in conjunction with FIG. 4, the socket portion 72 of the swivel member 70 has a socket 74 for receiving a ball member 88. The swivel member 70 is permanently attached to the ball member 88 by first inserting the ball member 88 into the socket 74 of the socket portion 72 and providing a retention member 84 which has an orifice 85 therethrough. The orifice 85 has a diameter which is smaller than the diameter of the ball member 88 and has an interior chamfered edge 91 for mating with the surface of the ball. Such a structure minimizes the contact between the ball and socket thus enabling maximum freedom of movement of the swivel member 70 on the ball member 88. The retention member 84 may be affixed to the swivel member 70 in any appropriate means, such as by screws or bolts 86 so that the ball is loosely retained by the retention member 84 in the socket 74.

A stem 89 is attached to the ball 88 and has an end remote from the ball 88 attached to a horizontal member 98 of the bracket means 90 in any appropriate way, such as by welding, as shown in FIG. 3, or bolting, as shown in FIG. 2. The stem 89 is preferably of a relatively small diameter compared to the ball portion 88 and has a length between the horizontal member 98 and the point of attachment to the ball 88 which is sufficient to allow a substantial amount of rotational freedom of the swivel member 70 about the ball 88 without coming in contact with the horizontal member.

In the illustrated embodiment, the bracket means 90 comprises a back plate 92 and a front plate 94 which are positioned on either side of a portion of the bicycle frame 40 and then clamped permanently to the bicycle frame 40 (FIG. 1) by an appropriate means, such as a bolt 96. The front plate 94 is then provided with the horizontal member or portion 98 to which the stem 89 of the ball member 88 is attached as previously described. A slot or orifice 99 (FIG. 2) in member 98 may be provided for the brake cable on bicycles with a center pull type brake. While a bracket means 90 may be used, it will be appreciated that many appropriate means by which a ball member may be attached or interconnected to a bicycle will suffice. Thus, the ball member may be permanently welded to the frame 40.

In operation, when the bracket means 90 is attached to the bicycle, the connecting member 50 has been inserted into the first passageway 78 of the swivel member 70 and is held by the release pin 82, and the respective pull bars 26 and 28 are interconnected to the connecting member 50, all relative motion between the trailer and the bicycle will occur about the ball member 88.

The trailer assembly may be quickly and easily disconnected from the swivel member 70 by simply withdrawing the release pin 82 which may, for example, be a conventional spring loaded pin, from passageway 80 by pulling on a ring 83 (FIG. 4). For convenience, the release pin 82 may be attached to the swivel member 70 by a chain or cable 87.

In another embodiment and with reference to FIG. 3, the swivel member 70 may be made immovable relative to the ball member 88 by simply providing a clamp screw 42 which may be tightened against the ball 88 to prevent the swivel member 70 from moving relative to the ball 88. Such a clamping mechanism is useful to prevent the swivel member 70 from moving about the ball 88 when the trailer assembly has been disconnected.

While the present invention has been particularly shown and described with reference to preferred embodiments, it will be understood by those skilled in the art that the foregoing and other changes in form and detail may be made without departing form the spirit and scope of the invention.

What is claimed is:

1. A quick release hitch assembly for releasably coupling a trailer to a vehicle comprising:

a coupling member having an upstanding post and a spherical ball portion attached to the top of the upstanding post, the coupling member being attached to the vehicle;

a swivel member having a socket portion for permanently mounting the swivel member essentially on the ball portion, the swivel member having a ball receiving socket therein, slightly less than half of the sphere of the ball portion being positioned in the ball receiving socket, the swivel member further having a retention disc with a central orifice having an interior chamfered edge, the central orifice of the retention disc having a diameter less than the diameter of the ball member, the ball member being loosely retained in the ball receiving socket by the retention disc when the retention disc is attached to the swivel member about the peripheral edge of the ball receiving socket whereby the swivel member is freely movable about the ball portion, the swivel member further having a hitch portion having a swivel member end surface, a first closed-ended, substantially straight, passageway extending from the swivel member end surface into the hitch portion, and a second open-ended passageway therethrough intersecting the first passageway;

a connecting member permanently attached to the trailer and having a connecting member shoulder and an attachment portion extending from the connecting member shoulder for being releasably inserted into the first passageway, the attachment portion having an attachment orifice therethrough, the attachment orifice being positioned so that it will be aligned with the second passageway when the attachment portion is inserted in the first passageway and the swivel member end surface abuts against the connecting member shoulder; and a pin for being removably inserted through the second passageway and the attachment orifice for essentially coupling the connecting member to the swivel member, the connecting member being released from the swivel member by removing the pin from the second passageway and the attachment orifice.

2. The hitch assembly of claim 1 wherein the connecting member further comprises a trailer deflection means interconnected to the trailer wherein the deflection means comprises:

A pair of pull bars interconnected between the attachment portion and the trailer on opposite sides thereof, the spacing of the pull bars at a front location of the trailer nearest the attachment portion being about the same as the width of the trailer at the front location, the spacing between the pull bars continuously and gradually decreasing in the direction of the attachment portion whereby the trailer is deflected away from a stationary object by the pull bars.

3. The hitch assembly of claim 2 wherein the connecting member further comprises gripping means between the attachment portion and the pair of pull bars for hand-pulling the trailer assembly when the trailer is disconnected from the hitch portion of the swivel member and the cross-section of the first passageway and the cross-section of the connecting member attachment portion are oval wherein the shape of the cross-section of the attachment portion is substantially the same as the shape of the cross-section of the first passageway for allowing the attachment portion to be releasably inserted in the first passageway.

* * * * *